United States Patent
Hayashi et al.

(10) Patent No.: US 7,060,785 B2
(45) Date of Patent: Jun. 13, 2006

(54) PROCESS FOR CONTINUOUS PRODUCTION OF BRANCHED POLYARYLENE SULFIDES

(75) Inventors: Mikiya Hayashi, Ichihara (JP); Kouichi Suga, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/513,467

(22) PCT Filed: Apr. 21, 2003

(86) PCT No.: PCT/JP03/05043

§ 371 (c)(1), (2), (4) Date: Nov. 19, 2004

(87) PCT Pub. No.: WO03/095527

PCT Pub. Date: Nov. 20, 2003

(65) Prior Publication Data

US 2006/0025632 A1    Feb. 2, 2006

(30) Foreign Application Priority Data

May 8, 2002    (JP)    ............................. 2002-132824

(51) Int. Cl.
*C08G 75/14*    (2006.01)
(52) U.S. Cl. .................................... 528/388
(58) Field of Classification Search ................ 528/388
See application file for complete search history.

(56) References Cited

U.S. PATENT DOCUMENTS

| 4,056,515 A | 11/1977 | Vidaurri, Jr. ............... 260/79.1 |
| 4,060,520 A | 11/1977 | Irvin ......................... 260/79.1 |
| 4,066,632 A | 1/1978 | Anderson et al. .......... 260/79.1 |
| 5,342,920 A * | 8/1994 | Imai et al. ................... 528/388 |
| 2002/0147299 A1* | 10/2002 | Koyama ..................... 528/373 |

FOREIGN PATENT DOCUMENTS

| JP | 2-298515 | 12/1990 |
| JP | 7-10997 | 1/1995 |
| JP | 7-278304 | 10/1995 |
| JP | 7-286042 | 10/1995 |
| JP | 9-169844 | 6/1997 |
| JP | 2000-290375 | 10/2000 |
| JP | 2002-265603 | 9/2002 |

* cited by examiner

*Primary Examiner*—J. Parsa
(74) *Attorney, Agent, or Firm*—Steptoe & Johnson LLP

(57) ABSTRACT

A process for continuous production of a branched polyarylene sulfide, which includes pre-polymerizing a sulfur source with a dihalogenated aromatic compound in such a manner that the reaction rate of the dihalogenated aromatic compound is less than 95% so as to produce a polyarylene sulfide, prepolymer, and polymerizing the prepolymer in the presence of a branching agent while dispersing the phase of the polymer into the form of spherical droplets in the phase of a solvent. When the prepolymer is added to the solvent phase to which a phase separator is beforehand added, spherical droplets of the polymer phase can be produced.

14 Claims, No Drawings

PROCESS FOR CONTINUOUS PRODUCTION OF BRANCHED POLYARYLENE SULFIDES

TECHNICAL FIELD

The present invention relates to a process for continuous production of a branched polyarylene sulfide.

RELATED ART

Hitherto, the polymerization of polyarylene sulfide has been carried out in a batch manner. However, in recent years, the request that the polymerization should be continuously performed has been made high from the viewpoint of an improvement in the producing efficiency thereof. Processes for continuous polymerization of a polyarylene sulfide are disclosed in, e.g., U.S. Pat. Nos. 4,056,515, 4,060,520% and 4,066,632. However, all of polyarylene sulfides obtained by these processes have low molecular weights.

As a process for making the molecular weight of a polyarylene sulfide high, suggested is a continuously-polymerizing process in which a phase separator (such as water, sodium acetate or alkali metal salt) is used to separate two phases of a polymer phase and a solvent phase.

For example, in JP-A-9-169844, in order to increase the molecular weight of a polyarylene sulfide, there is suggested a process in which a reaction system is separated into a polymer phase and a solvent phase, the ratio between the polymer phase and the solvent phase is made constant to produce the polyarylene sulfide, and then the polymer phase and the solvent phase are taken out separately. However, in this process, there are such problems that the pipe structure of the device for the polymerization is complicated or the flow rate of the reaction solution is not easily controlled. Thus, this process is insufficient for coping with the problems. In other words, in continuous polymerization using a phase separator, it is important that when a polymer phase and a solvent phase are taken out from a polymerizing tank, the ratio between the polymer phase and the solvent phase is kept constant to keep the polyarylene sulfide composition (concentration) in the polymerizing tank constant at all times.

Thus, in order to solve such problems, Japanese Patent Application No. 2001-068495 suggests a process in which a prepolymer pre-polymerized in a batch reactor is introduced into a polymerizing tank in which a phase separator and a solvent are beforehand charged so as to produce spherical droplets of a polymer phase, thereby polymerizing a polyarylene sulfide continuously. In other words, the polymerization advances into the state that the polymer phase is homogeneously dispersed into spherical droplets in the solvent phase in the polymerizing tank. According to this process, the solvent phase and the polymer phase are together taken out from the polymerizing tank in the state that they are mixed. At this time, the polymer phase is substantially homogeneously dispersed as well in the solvent phase; therefore, the solvent phase and the polymer phase can be taken out at a constant ratio so that the polyarylene sulfide composition (concentration) in the polymerizing tank can be kept constant. As a result, a linear polyarylene sulfide can be produced in a stable state for a long time.

However, it has been found out from further repeated investigations that when a branched polyarylene sulfide is produced by this process, the polymer phase thereof is not easily kept in spherical droplets for a long time (for example, 100 hours or more) and the polymer phase/solvent phase cannot be taken out at a constant ratio from the polymerizing tank, whereby the sulfide cannot be stably produced for a long term. That is, the polymer phase becomes an indeterminate form to disperse into the solvent phase so that a mixture of the polymer phase and the solvent phase cannot be taken out at a constant ratio from the polymerizing tank. It is probably considered that the reason why the spherical droplets of the polymer phase cannot be maintained is that the physical property of branched polyarylene sulfide is different from that of linear polyarylene sulfide.

In light of the above-mentioned problems, the present invention has been made. An object thereof is to provide a process for continuous production of a branched polyarylene sulfide which makes it possible to form spherical droplets of a polymer layer over a long time and produce the branched polyarylene sulfide stably.

The present inventors have repeated eager researches for attaining the above-mentioned object, so as to find out that when the reaction rate of a prepolymer is set to less than 95% in pre-polymerization, a branched polyarylene sulfide can be continuously polymerized in the state that spherical droplets are formed for a long time. Thus, the present invention has been made.

DISCLOSURE OF THE INVENTION

According to a first aspect of the present invention, there is provided a process for continuous production of a branched polyarylene sulfide, which comprises pre-polymerizing a sulfur source with a dihalogenated aromatic compound in such a manner that the reaction rate of the dihalogenated aromatic compound is less than 95% to produce a polyarylene sulfide prepolymer, and polymerizing the prepolymer in the presence of a branching agent while dispersing the phase of the polymer into the form of spherical droplets in the phase of a solvent.

According to a second aspect of the present invention, there is provided a process for continuous production of a branched polyarylene sulfide, which comprises pre-polymerizing a sulfur source with a dihalogenated aromatic compound in the presence of a branching agent in such a manner that the reaction rate of the dihalogenated aromatic compound is less than 95% to produce a polyarylene sulfide prepolymer, and polymerizing the prepolymer while dispersing the phase of the polymer into the form of spherical droplets in the phase of a solvent.

In the first and second aspects, in both the pre-polymerization step and the polymerization steps, the reaction can be carried out in the presence of a branching agent.

BEST MODE FOR CARRYING OUT THE INVENTION

A process for continuous production of a branched polyarylene sulfide is described hereinafter.

The production process of the present invention comprises reacting a sulfur source with a dihalogenated aromatic compound in such a manner that the reaction rate of the dihalogenated aromatic compound is less than 95%, so as to produce a polyarylene sulfide prepolymer (a pre-polymerization step), and polymerizing the prepolymer while dispersing the phase of the polymer into the form of spherical droplets in the phase of a solvent (a regular polymerization step).

First, the pre-polymerization step is described.

In this step, a sulfur source is caused to react with a dihalogenated aromatic compound in such a manner that the reaction rate of the dihalogenated aromatic compound is less than 95%, preferably from 30 to 90%, more preferably 40 to 80%, so as to produce a polyarylene sulfide prepolymer. If the reaction rate of the dihalogenated aromatic compound is 95% or more, spherical droplets of a polymer phase are not generated for a long term in the regular polymerization step, which will be described later. It appears that this is because the surface tension of the droplets of the polymer changes. On the other hand, if the reaction rate is less than 30%, the reaction rate is not sufficiently raised in the regular polymerization step so that the molecular weight of the resultant polyarylene sulfide may not be made high.

The reaction rate of the dihalogenated aromatic compound can be calculated from the mol ratios before and after the reaction.

The pre-polymerization step is preferably performed in an aprotic organic solvent. Examples thereof include amide compounds such as N,N-dimethylformamide, N,N-diethylformamide, N,N-dimethylacetoamide, N,N-diethylacetoamide, N,N-dipropylacetoamide, and N,N-dimethylbenzoic amide; N-alkylcaprolactams such as caprolactam, N-methylcaprolactam, N-ethylcaprolactam, N-ispropylcaprolactam, N-isobutylcaprolactam, N-n-propylcaprolactam, N-n-butylcaprolactam, and N-cyclohexylcaprolactam; lactam compounds such as N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl 2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, and N-methyl-3-ethyl-2-piperidone; urea compounds such as tetramethylurea, N,N'-dimethylethyleneurea, and N,N'-dimethylpropyleneurea; sulfur compounds such as dimethylsulfoxide, diethylsulfoxide, diphenylsulfone, 1-methyl-1-oxosulfolane, 1-ethyl-1-oxosulfolane, and 1-phenyl-1-oxosulfolane; and cyclic organic phosphorus compounds such as 1-methyl-1-oxophospholan, 1-n-propyl-1-oxophospholan, and 1-phenyl-1-oxophospholan. Of these, N-alkylcaprolactams and N-alkylpyrrolidones are preferable, and N-methyl-2-pyrrolidone is particularly preferable.

These aprotic organic solvents may be used alone or in the form of a mixture of two or more thereof. The solvents may be mixed with a different solvent component which does not hinder the object of the present invention, such as water, and the mixed solvent can be used as an aprotic organic solvent.

Examples of the sulfur source include alkali metal sulfides, alkali metal hydrosulfides, and hydrogen sulfide. Of these, preferable are alkali metal sulfides, and more preferable is lithium sulfide.

In order to make the reaction efficiency high in the present invention, the sulfur source can be used together with an alkali metal hydroxide such as lithium hydroxide.

Examples of the dihalogenated aromatic compound include dichlorobenzenes such as m-dichlorobenzene, and p-dichlorobenzene; alkyl-substituted dichlorobenzene or cycloalkyl-substituted dichlorobenezene such as 2,3-dichlorotoluene, 2,5-dichlorotoluene, 2,6-dichlorotoluene, 3,4-dichlorotoluene, 2,5-dichloroxylene, 1-ethyl-2,5-dichlorobenzene, 1,2,4,5-tetramethyl-3,6-dichlorobenzene, 1-n-hexyl-2,5-dichlorobenzene, and 1-cyclohexyl-2,5-dichlorobenzene; aryl-substituted dichlorobenzenes such as 1-phenyl-2,5-dichlorobenzene, 1-benzyl-2,5-dichlorobenzene, and 1-p-toluyl-2,5-dichlorobenzene; dichlorobiphenyls such as 4,4'-dichlorobiphenyl; and dichloronaphthalenes such as 1,4-dichloronaphthalene, 1,6-dichloronaphthalene, and 2,6-dichloronaphthalene. Of these, dichlorobenzens are preferable, and p-chlorobenzene is particularly preferable.

As the dihalogenated aromatic compound, compounds wherein the chlorines of the above-mentioned dichloro aromatic compounds are substituted with fluorines, bromines and iodines can be similarly used.

In the pre-polymerization step, the sulfur source and the dihalogenated aromatic compound are caused to react with each other preferably from 180 to 220° C., more preferably from 190 to 210° C. If the reaction time is lower than 180° C., a long time may be required to advance the reaction. On the other hand, if it is over 230° C., a polymer phase in subsequent continuous polymerization may not become spherical droplets over a long time. It appears that this is because physical properties of the polymer droplets, such as the surface tension thereof, change.

The concentration of the sulfur source in the aprotic organic solvent is preferably set into the range of 1.4 to 2.8 mol/L, more preferably from 1.7 to 2.3 mol/L. If the concentration is out of the range, spherical droplets of the polymer phase may not be generated.

The mol ratio between the dihalogenated aromatic compound and sulfur atoms in the sulfur source (the dihalogenated aromatic compound/the sulfur) is preferably from 0.90 to 1.10, more preferably from 0.95 to 1.00. If the mol ratio is smaller than 0.90, the polyarylene sulfide may decompose during the reaction. On the other hand, if the ratio is larger than 1.10, costs for subsequent collection of the starting materials may become high.

The mol ratio between water mixed with the aprotic organic solvent and the sulfur atoms in the sulfur source (water/the sulfur) is preferably from 0.20 to 2.00, more preferably from 0.30 to 1.50. If the mol ratio is smaller than 0.20, the reaction system may decompose in subsequent continuous polymerization. On the other hand, if the ratio is larger than 2.00, the reaction rate in the subsequent continuous polymerization may lower so that the polymer yield become low.

In the pre-polymerization step, the manner for polymerizing the prepolymer is not particularly limited if the reaction rate of the dihalogenated aromatic compound can be set to less than 95%. The polymerizing manner may be, for example, a batch manner or a continuous manner. The batch manner is preferably used.

The branching agent may be introduced in the pre-polymerization step so as to pre-polymerize the prepolymer in the presence of the branching agent, or may be introduced in the regular polymerization step which will be described later, so as to polymerize a polymer in the presence of the branching agent.

The following describes the regular polymerization step.

In this step, the prepolymer obtained in the pre-polymerization step is polymerized to produce a polymer. At this time, the polymerization is performed in the state that spherical droplets of the phase of the polymer are dispersed in the phase of a solvent.

Herein, the word "spherical" includes meanings of complete spheres, elliptic spheres, products that have a shape similar thereto, or products that have a shape of a deformed sphere but substantially close to a sphere. The size thereof is usually 1000 microns or less when the polymerization ends.

Examples of the method for forming the spherical droplets include a method in which the prepolymer is added to the phase of a solvent to which a phase separator is beforehand added, and a method in which spherical droplets are formed beforehand by batch polymerization under specific conditions, and then the prepolymer is added thereto.

In the former method, the pre-polymerized prepolymer (usually at 180 to 220° C.) is put into a reactor (usually at 230 to 280° C.), for the regular polymerization, which contains a phase separator, thereby forming the spherical droplets. Specifically, when NMP is used as the solvent in the reactor for the pre-polymerization, the prepolymer is dispersed in the form of fine particles not dissolved in NMP. When this prepolymer is put into the reactor for the regular polymerization which contains lithium chloride (phase separator) and NMP, the polymer is dissolved since the temperature of the reactor is high. Consequently, spherical droplets composed of the polymer and the solvent are formed. The spherical droplets are substantially homogeneously dispersed in the solvent phase. In this state, the prepolymer is polymerized to produce a polymer.

In the latter method, the temperature of a reactor for the regular polymerization, in which a monomer is put, is raised up to the temperature for the polymerization thereof in a short time. As a result, spherical droplets composed of a polymer and the solvent are formed. For example, the temperature is raised from room temperature to about 260° C. in about 30 minutes. In the state that the spherical droplets are formed in this way, a prepolymer which is separately pre-polymerized is put in the reactor for the regular polymerization and then the pre-polymer is polymerized.

In order to form the spherical droplets in any one of the above-mentioned methods, a phase separator having a given concentration is contained in the reactor for the regular polymer. The concentration of the phase separator is preferably from 2.8 to 5.6 mol/L, more preferably from 3.4 to 4.6 mol/L per liter of the solvent. If the concentration is less than 2.8 mol/L, the spherical droplets of the polymer phase may not be generated. On the other hand, if the concentration is more than 5.6 mol/L, costs for a subsequent process for collecting the starting mateirals may become high.

Examples of the phase separator include alkali metal salts such as lithium chloride, sodium acetate and lithium, and water. Of these, lithium chloride is preferable.

In the case that a polyarylene sulfide is produced from the dichloroaromatic compound and lithium sulfide, lithium chloride is generated as a by-product. This functions as a phase separator.

In the regular polymerization step, the polymerization reaction of the prepolymer advances in the state that the spherical droplets are dispersed for a long term. As a result, a branched polyarylene sulfide having a high molecular weight is continuously produced.

In this step, the prepolymer produced in the pre-polymerization step may be caused to react alone as a polymerization starting material. It is allowable to add the above-mentioned sulfur source, dihalogenated aromatic compound and so on to the prepolymer, adjust the mol ratio therebetween, and cause these to react with each other as polymerization starting materials.

As described above, the branching agent may be put in the pre-polymerization step, or may be put in the regular polymerization step.

Examples of the branching agent include halogenated aromatic compounds each having active hydrogen, and polyhalogenated aromatic compounds and polyhalogenated aromatic nitro compounds each having in a single molecule thereof three or more halogen atoms. Of these, preferable is the polyhalogenated aromatic compounds, and more preferably is 1,2,4-trichlorobenzene (TCB).

Usually, the mol ratio of the branching agent to sulfur atoms in the sulfur source (the branching agent/S) is from about 0.001 to about 0.05. If the mol ratio is too small, a polymer wherein the characteristic of branch is not exhibited may be obtained. On the other hand, if the mol ratio is too large, the molecular weight of the polymer may become too high so that the polymer be gelatinized. As a result, the reaction may not be able to be controlled.

In this step, the mol ratio of Li to the sulfur source (Li/S) is preferably from 2.00 to 2.40, more preferably from 2.05 to 2.30. If the mol ratio is smaller than 2.00, a polymer having a sufficient molecular weight may not be obtained. On the other hand, if the mol ratio is more than 2.40, costs may be demanded for collecting Li.

The mol ratio of the dihalogenated aromatic compound to the sulfur source (the dihalogenated aromatic compound/sulfur) is preferably from 0.95 to 1.20, more preferably from 1.00 to 1.10. If the mol ratio is less than 0.95, the polyarylene sulfide may decompose. On the other hand, if the mol ratio is more than 1.20, costs may be demanded for collecting the dihalogenated aromatic compound unreacted.

The dihalogenated aromatic compound/the solvent (polymerization concentration) is preferably from 1.4 to 2.8 mol/L, more preferably form 1.7 to 2.3 mol/L. If the concentration is less than 1.4, the productivity of the polymer may deteriorate. On the other hand, if the concentration is more than 2.8, a polymer having a sufficient molecular weight may not be obtained.

In the regular polymerization step, the prepolymer is polymerized preferably at 230 to 280° C., more preferably at 245 to 275° C., even more preferably at 250 to 270° C. If this temperature is lower than 230° C., a polymer having a sufficient molecular weight may not be obtained. On the other hand, if the temperature is higher than 280° C., the polyarylene sulfide may decompose.

In the regular polymerization step, the average residence time of the polymerization starting material(s) in the polymerizing tank is preferably from 0.5 to 10 hours, more preferably from 1 to 7 hours, even more preferably from 2 to 5 hours. If this time is shorter than 0.5 hour, a polymer having a sufficient molecular weight may not be obtained. On the other hand, if the time is longer than 10 hours, the production efficiency may deteriorate or the polymer may be gelatinized.

In the regular polymerization step, the number of the used polymerizing tank(s) (stage(s)) is not particularly limited, and many tanks (stages) may be used. The temperature condition may be changed to two or more stage conditions. In this case, it is sufficient that the polymer phase in at least one of the polymerizing tanks is in a spherical droplet state and the process of the present invention can be applied in the tank. Preferably, the process of the present invention is applied to at least the last of the polymerizing tanks. However, the process can be applied to all the polymerizing tanks.

The polymerizing tank is not limited to any especial kind. Preferably, a reaction tank suitable for a completely mixing tank is used. The polymerizing tank has stirring fans. The stirring fans are preferably large-sized stirring fans the tips of which have no notches, anchor fans, screw fans, Max Blend fans, large-sized paddle fans, or full-zone fans.

In the present invention, the specific prepolymer produced in the pre-polymerization step is used to produce a branched polyarylene sulfide; therefore, in the regular polymerization step, the form of the polymer phase containing the continuously-produced branched polyarylene sulfide can be kept in the form of spherical droplets for a long time, for example, 100 hours or more.

This makes it possible that when a mixture of the polymer phase and the solvent phase is continuously taken out from the polymerizing tank, the polymer phase and the solvent phase are taken out at a constant ratio for a long time. As a result, the concentration of the branched polyarylene sulfide in the polymerizing tank can be kept constant. Accordingly, the branched polyarylene sulfide can be stably obtained.

If necessary, the polymer phase and the solvent phase taken out at a constant ratio may be transferred to a next polymerizing tank so as to repeat the regular polymerization step again.

About conditions and so on other than the above-mentioned those in the regular polymerization step, for example, conditions and so on in JP-A-6-248077 can be used.

Water can be added to the polymerization solution after the regular polymerization step to such an extent that the branched polyarylene sulfide is not solidified, thereby performing washing operation. The amount of the water is varied dependently on the amount of the polymerization solution or the temperature thereof. It is sufficient that the water amount is such an amount that does not cause the solidification or precipitation of the branched polyarylene sulfide by excessive cooling of the sulfide. In general, it is preferable that in the washing tank, the polymerization solution and the water are stirred to be sufficiently mixed with each other.

The washing solution is not limited to any especial kind if impurities or by-products attached to the polymer are dissolved in the solution and the solution produces no bad effect on the polymer. Examples thereof include methanol, acetone, benzene, toluene, water and NMP. Of these, water is preferable.

Separating operation in a separating tank is applied to the polymerization solution after the polymerization reaction ends in order to separate the solution into the phase of the polymer and the phase of the solvent.

As a method for preparing lithium sulfide via lithium hydroxide from the separated solvent phase (made mainly of NMP, water and lithium chloride), for example, a method described in JP-A-2000-319009 can be used.

In order to obtain more satisfactory washing and separating effects, the washing and separating steps may be repeated any plural times.

In the present invention, the polymer phase subjected to the washing and separating steps contains the solvent still. Thus, it is preferable to remove the solvent. The operation for the solvent removal is not limited to any especial kind, and may be according to a solvent-removing method used in a known process for producing a polyarylene sulfide (for example, a flash method disclosed in JP-A-7-033878).

The branched polyarylene sulfide subjected to the solvent-removing operation can be taken out in a melted state, or cooled and solidified in an appropriate manner in a granular form. The method for the cooling may be cooling with air, water, oil or the like.

In the case that various products are formed from the branched polyarylene sulfide obtained by the present invention, the following may be appropriately incorporated into the branched polyarylene sulfide if necessary: a different polymer, a pigment, graphite, metal powder, glass powder, quartz powder, talc, calcium carbonate, glass fiber, carbon fiber, fillers such as various whiskers, a stabilizer, and a releasing agent.

The branched polyarylene sulfide obtained by the present invention can be used suitably for the material of various molded products, for example, the material of films, fibers, mechanical parts, electric parts, electronic parts, and others.

EXAMPLES

The present invention is more specifically described by way of working examples hereinafter. The solution viscosity of a polymer was measured with the following method.

Solution viscosity ($\eta$inh): The viscosity was measured at 206° C. with an Ubellohde's viscometer after keeping a sample in an $\alpha$-chloronaphthalene solution of 4 g/L concentration and 235° C. temperature for 30 min. to dissolve the sample therein.

[$\eta$] (dL/g)=ln (relative viscosity)/polymer concentration

Example 1

(1) Pre-polymerization (Batch Reaction)

Into a 10-L autoclave equipped with a stirrer having stirring fans were charged 3.5 L of N-methyl-2-pyrrolidone (NMP), 47.9 (2 mol) of anhydrous lithium hydroxide, and 459.5 g (10 mol) of lithium sulfide, and then the temperature thereof was raised to 210° C. in the atmosphere of nitrogen while the mixture was stirred. When the temperature reached 210° C., a mixture of 0.83 L of NMP, 1,426 g (9.7 mol) of p-dichlorobenzene (pDCB) and 54.2 g (3 mol) of water was added into the autoclave. The components therein were caused to react at 210° C. for 2 hours to synthesize a polyarylene sulfide oligomer (prepolymer). The reaction rate of pDCB in the pre-polymerization was 75%.

In the pre-polymerization, the sulfur concentration was 2.24 (mol/L), and the mol ratio between the chemicals was as follows: Li/S=2.20, pDCB/S=0.97, and $H_2O$/S=0.30.

The prepolymer was synthesized in accordance with an amount necessary for continuous polymerization in the next step, and provided for reaction.

(2) Regular Polymerization (Continuous Reaction)

Into an autoclave equipped with a stirrer having full-zone fans were charged 730 g of lithium chloride, 4.9 L of NMP, and 233 g of water, and then the temperature thereof was raised to 260° C. Next, into 1 kg of the prepolymer synthesized in the above (1) were incorporated 16.0 g of pDCB, 218.6 g of NMP, 2.82 g of 1,2,4-trichlorobenzene (TCB) and 33.6 g of water so as to adjust the mol ratio between the starting materials. While the prepared prepolymer was kept at 60° C., a gear pump was used to introduce the prepolymer continuously at a rate of 50.0 g/min. into a polymerizing tank to conduct continuous polymerization for a polyarylene sulfide. At this time, in the polymer phase dispersed in the solvent phase containing NMP, spherical droplets were generated.

In the regular polymerization, the concentration of lithium chloride charged before the reaction was 3.52 (mol/L), and the mol ratio between the chemicals after the adjustment, that is, the mol ratio at the time of the regular polymerization was as follows: pDCB/S=1.04, Li/S=2.20, $H_2O$/S=1.50, and TCB/S=0.01. The sulfur concentration was 1.76 (mol/NMP-L). The polymerization temperature was set to 260° C. and the average residence time ($\tau$) of the polymer in the polymerizing tank was set to 2 hours.

In order to keep the level of the liquid surface in the polymerizing tank constant, about 250 g of the polymer mixture was withdrawn from a withdrawing nozzle of the polymerizing tank one time every five minutes. This operation was continued for 100 hours. At this time, the state that droplets of the polymer phase were dispersed in each sample withdrawn after 50 hours and 100 hours was evaluated with the eye through a microscope. The results are shown in Table 1. The standard for the evaluation was as follows.

◯: The polymer phase was dispersed in a spherical droplet state.

X: The polymer phase was dispersed in an indeterminate form state.

The sample withdrawn after 100 hours was subjected to inclination-filtration so as to be separated into the polymer and the polymerization solution. The resultant polymer was heated and stirred with hot water 2 times for washing. Thereafter, the polymer was vacuum-dried at 120° C. for 12 hours. The solution viscosity ηinh of this polymer was measured by the above-mentioned method. As a result, the viscosity was 0.24 dL/g. The form of this polymer was spherical. Thereafter, the polymerizing tank was cooled and opened to observe the form of the polymer. As a result, the form was spherical still.

Example 2

Continuous polymerization for a polyarylene sulfide was conducted and the state that droplets of the polymer phase thereof were dispersed was evaluated in the same way as in Example 1 except that the pre-polymerization was conducted for 1 hour and the reaction rate of pDCB was lowered to 50% in Example 1. As a result, in each of samples withdrawn after 50 hours and 100 hours, the form of the droplets of the polymer phase was kept spherical. The polymer after the polymerizing tank was cooled and opened was also kept in a spherical dispersion state. The solution viscosity ηinh of the polymer was 0.22 dL/g.

Example 3

Continuous polymerization for a polyarylene sulfide was conducted and the state that droplets of the polymer phase thereof were dispersed was evaluated in the same way as in Example 1 except that the pre-polymerization was conducted for 0.5 hour and the reaction rate of pDCB was lowered to 40% in Example 1. As a result, in each of samples withdrawn after 50 hours and 100 hours, the form of the droplets of the polymer phase was kept spherical. The polymer after the polymerizing tank was cooled and opened was also kept in a spherical dispersion state. The solution viscosity ηinh of the polymer was 0.20 dL/g.

Example 4

Continuous polymerization for a polyarylene sulfide was conducted and the state that droplets of the polymer phase thereof were dispersed was evaluated in the same way as in Example 1 except that the charging amount of TCD was changed to 1.41 g and the charging timing thereof was changed to the same time when pDCB was charged in the pre-polymerization instead of the time of the regular polymerization in Example 1. As a result, in each of samples withdrawn after 50 hours and 100 hours, the form of the droplets of the polymer phase was kept spherical. The polymer after the polymerizing tank was cooled and opened was also kept in a spherical dispersion state. The solution viscosity ηinh of the polymer was 0.23 dL/g.

COMPARATIVE EXAMPLE 1

Continuous polymerization for a polyarylene sulfide was conducted and the state that droplets of the polymer phase thereof were dispersed was evaluated in the same way as in Example 1 except that the pre-polymerization was conducted for 5 hours and the reaction rate of PDCB was raised to 95% in Example 1. As a result, the form of droplets of the polymer phase in a sample withdrawn after 50 hours was kept spherical. However, the form of droplets of the polymer phase in a sample withdrawn after 100 hours was not kept spherical, and was an indeterminate form. The polymer after the polymerizing tank was cooled and opened was in an indeterminate granular form. The solution viscosity ηinh of the polymer was 0.27 dL/g.

TABLE 1

| Items | Unit | Example 1 | Example 2 | Example 3 | Example 4 | Comparative Example 1 |
|---|---|---|---|---|---|---|
| Pre-polymerization | | | | | | |
| Sulfur concentration | mol/L | 2.24 | 2.24 | 2.24 | 2.24 | 2.24 |
| Li/S | mol/mol | 2.20 | 2.20 | 2.20 | 2.20 | 2.20 |
| PDCB/S | mol/mol | 0.97 | 0.97 | 0.97 | 0.97 | 0.97 |
| H$_2$O/S | mol/mol | 0.30 | 0.30 | 0.30 | 0.30 | 0.30 |
| Reaction temperature | ° C. | 210 | 210 | 210 | 210 | 210 |
| Reaction rate of pDCB | % | 75 | 50 | 40 | 75 | 95 |
| Regular polymerization | | | | | | |
| Li/Cl/NMP | mol/L | 3.52 | 3.52 | 3.52 | 3.52 | 3.52 |
| Sulfur concentration | mol/L | 1.76 | 1.76 | 1.76 | 1.76 | 1.76 |
| Li/S | mol/mol | 2.20 | 2.20 | 2.20 | 2.20 | 2.20 |
| PDCB/S | mol/mol | 1.04 | 1.04 | 1.04 | 1.04 | 1.04 |
| H$_2$O/S | mol/mol | 1.50 | 1.50 | 1.50 | 1.50 | 1.50 |
| TCB/S | mol/mol | 0.01 | 0.01 | 0.01 | 0.005 | 0.01 |
| Reaction temperature | ° C. | 260 | 260 | 260 | 260 | 260 |
| τ | hr | 2.0 | 2.0 | 2.0 | 2.0 | 2.0 |

TABLE 1-continued

| Items | Unit | Example 1 | Example 2 | Example 3 | Example 4 | Comparative Example 1 |
|---|---|---|---|---|---|---|
| Dispersion State | | | | | | |
| After 50 hours | | ○ | ○ | ○ | ○ | ○ |
| After 100 hours | | ○ | ○ | ○ | ○ | x |
| Solution viscosity ηinh (dL/g) | | 0.24 | 0.22 | 0.20 | 0.23 | 0.27 |

INDUSTRIAL APPLICABILITY

According to the present invention, it is possible to provide a process for continuous production of a branched polyarylene sulfide in which spherical droplets of the layer of the polymer can be formed for a long time and the branched polyarylene sulfide can be produced stably.

The invention claimed is:

1. A process for continuous production of a branched polyarylene sulfide, which comprises:
   pre-polymerizing a sulfur source with a dihalogenated aromatic compound in such a manner that the reaction rate of the dihalogenated aromatic compound is 40 to 80% to produce a polyarylene sulfide prepolymer, and
   polymerizing the prepolymer in the presence of a branching agent while dispersing a phase of the polymer into the form of spherical droplets in a phase of a solvent.

2. A process for continuous production of a branched polyarylene sulfide, which comprises:
   pre-polymerizing a sulfur source with a dihalogenated aromatic compound in the presence of a branching agent in such a manner that the reaction rate of the dihalogenated aromatic compound is 40 to 80% to produce a polyarylene sulfide prepolymer, and
   polymerizing the prepolymer while dispersing a phase of the polymer into the form of spherical droplets in a phase of a solvent.

3. The process for continuous production of a branched polyarylene sulfide according to claim 1, wherein the prepolymer is produced in a batch manner.

4. The process for continuous production of a branched polyarylene sulfide according to claim 1, wherein the pre-polymerizing is performed at 180 to 220° C.

5. The process for continuous production of a branched polyarylene sulfide according to claim 1, wherein the polymerizing is performed at 230 to 280° C.

6. The process for continuous production of a branched polyarylene sulfide according to claim 2, wherein the prepolymer is produced in a batch manner.

7. The process for continuous production of a branched polyarylene sulfide according to claim 2, wherein the pre-polymerizing is performed at 180 to 220°.

8. The process for continuous production of a branched polyarylene sulfide according to claim 2, wherein the polymerizing is performed at 230 to 280°.

9. The process for continuous production of a branched polyarylene sulfide according to claim 1, wherein the reaction rate is 40 to 75%.

10. The process for continuous production of a branched polyarylene sulfide according to claim 2, wherein the reaction rate is 40 to 75%.

11. The process for continuous production of a branched polyarylene sulfide according to claim 1, including adding beforehand a phase separator to the phase of a solvent, and thereafter adding the prepolymer thereto.

12. The process for continuous production of a branched polyarylene sulfide according to claim 2, including adding beforehand a phase separator to the phase of a solvent, and thereafter adding the prepolymer thereto.

13. The process for continuous production of a branched polyarylene sulfide according to claim 1, including forming beforehand spherical droplets by batch polymerization, and thereafter adding the prepolymer thereto.

14. The process for continuous production of a branched polyarylene sulfide according to claim 2, including forming beforehand spherical droplets by batch polymerization, and thereafter adding the prepolymer thereto.

* * * * *